United States Patent
Schaedler et al.

(10) Patent No.: US 9,217,084 B2
(45) Date of Patent: Dec. 22, 2015

(54) CONSTRAINED MICROLAYER CELLULAR MATERIAL WITH HIGH STIFFNESS AND DAMPING

(71) Applicant: HRL LABORATORIES, LLC, Malibu, CA (US)

(72) Inventors: Tobias A. Schaedler, Oak Park, CA (US); Alan J. Jacobsen, Woodland Hills, CA (US); William Carter, Calabasas, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 57 days.

(21) Appl. No.: 13/894,295

(22) Filed: May 14, 2013

(65) Prior Publication Data
US 2014/0272277 A1    Sep. 18, 2014

Related U.S. Application Data

(60) Provisional application No. 61/778,253, filed on Mar. 12, 2013.

(51) Int. Cl.
| | |
|---|---|
| *B44C 1/22* | (2006.01) |
| *B32B 3/12* | (2006.01) |
| *B29C 44/00* | (2006.01) |
| *B32B 3/26* | (2006.01) |
| *C09D 1/00* | (2006.01) |
| *B29C 67/20* | (2006.01) |

(52) U.S. Cl.
CPC ................ *C09D 1/00* (2013.01); *B29C 67/202* (2013.01); *Y10T 428/24149* (2015.01); *Y10T 428/249953* (2015.04)

(58) Field of Classification Search
CPC .......... B29C 67/202; B32B 3/12; B32B 3/26; Y10T 428/24149
USPC ........................................................ 216/37
See application file for complete search history.

(56) References Cited

U.S. PATENT DOCUMENTS

| | | |
|---|---|---|
| 5,524,673 A | 6/1996 | Noone et al. |
| 7,382,959 B1 | 6/2008 | Jacobsen |
| 7,653,279 B1 | 1/2010 | Jacobsen |
| 8,148,276 B2 | 4/2012 | Nejhad et al. |

(Continued)

FOREIGN PATENT DOCUMENTS

| | | |
|---|---|---|
| EP | 0936377 A2 | 8/1999 |
| WO | WO 95/11752 A1 | 5/1995 |

OTHER PUBLICATIONS

Alf et al., "Chemical Vapor Deposition of Conformal, Functional, and Responsive Polymer Films," Advanced Materials, 22:1993-2027, 2010.
Kumar et al., "Chemical Vapor Deposition of Carbon Nanotubes: A Review on Growth Mechanism and Mass Production," Journal of Nanoscience and Nanotechnology, 10(6):3739-3758, 2010.
Lee et al., "Development of Conformal PDMS and Parylene Coatings for Microelectronics and MEMS Packaging," Proceedings of IMECE, pp. 1-5, 2005.
http://www.grantadesign.com/products/ces/; 2 pages, Feb. 4, 2014.
http://www.grantadesign.com/; 2 pages, Feb. 4, 2014.
Written Opinion and Search Report for International Application No. PCT/US2013/041166, mailed Nov. 21, 2013, 12 pages.
International Preliminary Report on Patentability for PCT Application No. PCT/US2013/041166; mailed Feb. 13, 2015, 7 pages.

*Primary Examiner* — Shamim Ahmed
(74) *Attorney, Agent, or Firm* — Christie, Parker & Hale, LLP

(57) ABSTRACT

Composite materials with high damping and high stiffness at relatively low density. These materials include three-dimensional structures of interconnected ligaments, which have multiple concentric layers alternating between stiff constraining layers and soft damping layers, so that bulk deformation of the structure results in high local shear strain and correspondingly high bulk damping.

21 Claims, 12 Drawing Sheets

(56) References Cited

U.S. PATENT DOCUMENTS

| | | | |
|---|---|---|---|
| 8,320,727 B1 * | 11/2012 | Jacobsen et al. | 385/129 |
| 8,353,240 B1 | 1/2013 | Schaedler et al. | |
| 2005/0206035 A1 | 9/2005 | Endres et al. | |
| 2008/0157283 A1 * | 7/2008 | Moslehi | 257/618 |
| 2009/0274865 A1 | 11/2009 | Wadley et al. | |

* cited by examiner

CONSTRAINED MICROLAYER CELLULAR MATERIAL WITH HIGH STIFFNESS AND DAMPING

CROSS-REFERENCE TO RELATED PATENTS

This application claims the benefit of Provisional Application No. 61/778,253, filed Mar. 12, 2013, entitled "CONSTRAINED MICROLAYER CELLULAR MATERIAL WITH HIGH STIFFNESS AND DAMPING", the entire content of which is incorporated herein by reference. This application incorporates by reference in their entirety, as if set forth in full, U.S. Pat. No. 7,653,279 ("the '279 patent") and U.S. Pat. No. 7,382,959 ("the '959 patent").

FIELD

The present invention relates to energy-absorbing materials and more particularly to low-density composite materials exhibiting significant mechanical damping.

BACKGROUND

Damping materials, i.e., materials which repeatedly dissipate energy when deformed, are used in numerous applications. They may be used, for example, to mitigate vibrations, e.g., in aircraft airframes, to absorb sound, e.g., in automobiles, or to cushion impacts. It may be desirable, as in these examples, for the damping material to provide significant damping without adding more mass than necessary to the structure in which it is used. Since the damping efficiency depends on the product of the damping coefficient and the modulus, a material with high stiffness is desirable. Thus, there is a need for a lightweight material with high stiffness, and which repeatedly absorbs mechanical energy when deformed.

SUMMARY

Embodiments of the present invention provide composite materials with high damping and high stiffness at relatively low density. These materials include three-dimensional structures of interconnected ligaments, in which the ligaments have multiple concentric layers alternating between stiff constraining layers and soft damping layers, so that bulk deformation of the structure results in high local shear strain and correspondingly high damping.

According to an embodiment of the present invention there is provided a three-dimensional open-celled cellular structure including a plurality of ligaments; each of the plurality of ligaments including a plurality of layers; a first layer of the plurality of layers including a first substance; the first layer being directly between a second layer of the plurality of layers including a second substance and a third layer of the plurality of layers including a third substance, the first substance having a shear modulus less than one tenth the Young's modulus of the second substance, and less than one tenth the Young's modulus of the third substance.

In one embodiment, the ligaments are hollow tubes.

In one embodiment, the outer diameter of a ligament of the plurality of ligaments is more than 20 times greater than the thickness of the second layer.

In one embodiment, a ligament of the plurality of ligaments includes the third layer as a solid core, and the diameter of the solid core is less than the thickness of the second layer.

In one embodiment, the ligaments include solid cores; and the solid cores include a substance having a shear modulus less than one tenth the Young's modulus of the second substance.

In one embodiment, the second substance and the third substance are the same substance.

In one embodiment, the first substance has a damping coefficient for which tan(δ) exceeds 0.1.

In one embodiment, the ligaments are substantially straight.

In one embodiment, the ratio of the thickness of the first layer to the thickness of the second layer is between 0.02 and 2.

In one embodiment, the distance between one ligament of the plurality of ligaments and another ligament of the plurality of ligaments is less than 3 centimeters.

In one embodiment, the structure includes 1000 ligaments, wherein the ratio of the total volume of the ligaments, to the total volume of the structure, is less than 0.3.

In one embodiment, the ligaments include a plurality of interconnected ligaments having a three-dimensional order.

In one embodiment, the ligaments are configured as an open-cell foam structure.

In one embodiment, the ligaments are configured as a honeycomb structure.

In one embodiment, the third substance includes, as a major component, a substance selected from the group consisting of: a first sub-group consisting of magnesium, aluminum, titanium, vanadium, chromium, iron, cobalt, nickel, copper, zinc, zirconium, niobium, molybdenum, tantalum, tungsten, and alloys thereof, a second sub-group consisting of aluminum oxide, silicon, silicon dioxide, silicon carbide, silicon nitride, diamond, diamond like carbon, hafnium oxide, lanthanum oxide, titanium dioxide, titanium nitride, tungsten nitride, zinc oxide, zirconium dioxide, hafnium carbide, lanthanum carbide, tungsten carbide, zirconium carbide, tantalum carbide, and combinations thereof, and combinations of substances selected from the first sub-group and the second sub-group.

In one embodiment, the first substance includes, as a major component, a substance selected from the group consisting of polymers, thermoplastics, elastomers, rubbers, soft metals, bitumen materials, carbon nanotube arrays, and combinations thereof.

In one embodiment, the first substance includes, as a major component, a polymer selected from the group consisting of elastomers, thermoplastics, silicones, urethanes, acrylics, polyisoprene, polyolefins, poly(p-xylylenes), functionalized poly(p-xylylenes), poly(oxymethylenes), poly(3,4-ethylenedioxythiophene), functional poly(acrylates), methacrylates, poly(pyrrole-co-thiophene-3-acetic acids), poly(p-phenylene terephthalamides), poly(isoprene), poly(butadiene), poly(styrene-co-butadiene), poly(norbornene), poly(ethylene propylene), poly(ethylene-co-propylene-co-diene) (EPDM), polyolefins, butyl rubber, chloroprene rubber, polysulfide rubber, chlorosulfonated polyethylene, nitrile rubber (acrylonitrile-co-butadiene), hydrogenated nitrile rubber, poly(vinylchloride-co-nitrile), poly(ether urethane), poly(ester urethane), epichlorohydrin copolymer, poly(epichlorohydrin) poly(propylene oxide), ethylene vinyl acetate, silicone rubbers, polyphosphazenes, ethylene acrylic elastomer, poly(ethylene-co-methacrylate), and combinations thereof.

In one embodiment, the first substance includes, as a major component, a soft metal selected from the group consisting of indium, tin, lead, and alloys thereof.

In one embodiment, the ligaments are configured so that a uniform compression of the structure results in a local strain at one point in the structure exceeding the degree of uniform compression by a factor greater than 5.

In one embodiment, the ligaments are configured so that a uniform compression of the structure results in a local shear strain at one point in the structure exceeding the degree of uniform compression by a factor greater than 5.

In one embodiment, the plurality of layers includes a fourth layer including a fourth substance; and a fifth layer including a fifth substance, the fourth layer is directly between the fifth layer and the second layer; and the fourth substance has a shear modulus less than one tenth the Young's modulus of the second substance, and less than one tenth the Young's modulus of the fifth substance.

In one embodiment, the shear modulus of the first substance varies with temperature and the shear modulus of the fourth substance varies with temperature and over a first range of temperatures, the first substance has a shear modulus less than one tenth the Young's modulus of the second substance, and less than one tenth the Young's modulus of the third substance, and over a second range of temperatures, the fourth substance has a shear modulus less than one tenth the Young's modulus of the second substance, and less than one tenth the Young's modulus of the fifth substance, and the first range of temperatures is not the same as the second range of temperatures.

According to an embodiment of the present invention there is provided a three-dimensional open-celled cellular structure including: a plurality of ligaments, each ligament including a first layer and a second layer, separated by a gap.

In one embodiment, a surface, of the first layer, bounding the gap, has a root mean square roughness greater than 0.5 microns.

In one embodiment, the gap is empty.

In one embodiment, the gap includes discrete particles.

According to an embodiment of the present invention there is provided a three-dimensional open-celled cellular structure configured to accommodate a flow of fluid coolant through the structure.

According to an embodiment of the present invention there is provided a method for forming a hollow, open-celled cellular structure, the method including: forming a three dimensional template; forming a first coating layer of a first substance on the three dimensional template; forming a second coating layer of a second substance on the first coating layer; forming a third coating layer of a third substance on the second coating layer; and removing the three dimensional template, the second substance being different from the first substance, and the second substance being different from the third substance.

In one embodiment, the first substance is the same as the third substance.

In one embodiment, the forming of a three-dimensional template comprises forming a micro-truss template.

In one embodiment, the forming of the micro-truss template includes: exposing a volume of a photo-monomer to collimated light through a patterned mask.

In one embodiment, the forming of the micro-truss template includes: forming a plurality of first truss elements defined by a plurality of first self-propagating polymer waveguides and extending along a first direction; forming a plurality of second truss elements defined by a plurality of second self-propagating polymer waveguides and extending along a second direction; and forming a plurality of third truss elements defined by a plurality of third self-propagating polymer waveguides and extending along a third direction.

In one embodiment, one of the first substance, the second substance, and the third substance includes, as a major component, a substance selected from the group consisting of: a first sub-group consisting of magnesium, aluminum, titanium, vanadium, chromium, iron, cobalt, nickel, copper, zinc, zirconium, niobium, molybdenum, tantalum, tungsten, and alloys thereof, a second sub-group consisting of aluminum oxide, silicon, silicon dioxide, silicon carbide, silicon nitride, diamond, diamond-like carbon, hafnium oxide, lanthanum oxide, titanium dioxide, titanium nitride, tungsten nitride, zinc oxide, zirconium dioxide, hafnium carbide, lanthanum carbide, tungsten carbide, zirconium carbide, tantalum carbide, and combinations thereof, and combinations of substances selected from the first sub-group and the second sub-group.

In one embodiment, one of the first substance, the second substance, and the third substance includes, as a major component, a substance selected from the group consisting of polymers, thermoplastics, elastomers, rubbers, soft metals, bitumen materials, carbon nanotube arrays, and combinations thereof.

In one embodiment, one of the first substance, the second substance, and the third substance includes, as a major component, a viscoelastic polymer selected from the group consisting of elastomers, thermoplastics, silicones, urethanes, acrylics, polyisoprene, polyolefins, poly(p-xylylenes), functionalized poly(p-xylylenes), poly(oxymethylenes), poly(3,4-ethylenedioxythiophene), functional poly(acrylates), methacrylates, poly(pyrrole-co-thiophene-3-acetic acids), poly(p-phenylene terephthalamides), poly(isoprene), poly(butadiene), poly(styrene-co-butadiene), poly(norbornene), poly(ethylene propylene), poly(ethylene-co-propylene-co-diene) (EPDM), polyolefins, butyl rubber, chloroprene rubber, polysulfide rubber, chlorosulfonated polyethylene, nitrile rubber (acrylonitrile-co-butadiene), hydrogenated nitrile rubber, poly(vinylchloride-co-nitrile), poly(ether urethane), poly(ester urethane), epichlorohydrin copolymer, poly(epichlorohydrin) poly(propylene oxide), ethylene vinyl acetate, silicone rubbers, polyphosphazenes, ethylene acrylic elastomer, poly(ethylene-co-methacrylate), and combinations thereof.

In one embodiment, one of the first substance, the second substance, and the third substance includes, as a major component, a soft metal selected from the group consisting of indium, tin, lead, and alloys thereof.

In one embodiment, the removing of the micro-truss template includes etching out the micro-truss template.

In one embodiment, one of the forming of the first coating layer, the forming of the second coating layer, and the forming of the third coating layer includes using a technique selected from the group consisting of electro-plating, electrophoretic deposition, chemical vapor deposition, physical vapor deposition, atomic layer deposition, solution deposition, sol-gel deposition, and slurry deposition.

In one embodiment, the method includes removing the second coating layer.

In one embodiment, the forming of the first coating layer, the forming of the second coating layer, and the forming of the third coating layer include forming the second coating layer having a shear modulus less than one tenth the Young's modulus of each of the first coating layer and the third coating layer.

In one embodiment, there is provided a structure formed according to the method.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a constrained microlayer cellular material with high stiffness and damping provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
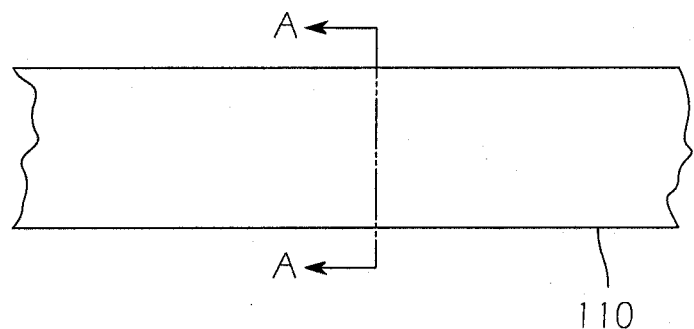
FIG. 1A is a side view of a portion of a ligament according to an embodiment of the present invention.
Figure 1B:
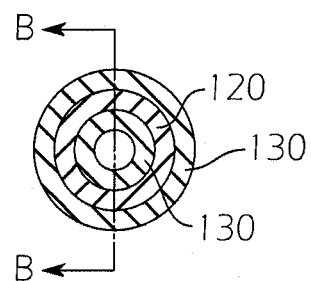
FIG. 1B is a cross-sectional view of a ligament according to an embodiment of the present invention.
Figure 1C:
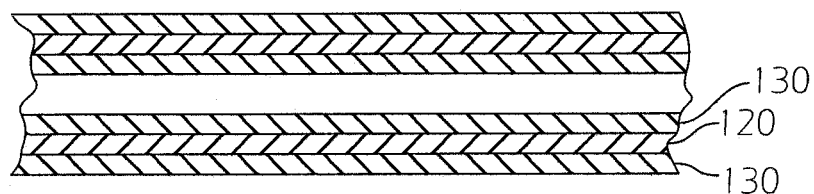
FIG. 1C is a cross-sectional view of a portion of a ligament according to an embodiment of the present invention.

In one embodiment, a constrained microlayer cellular material may be fabricated from a plurality of interconnected ligaments, each of which has internal structure providing enhanced damping. Referring to FIG. 1A, the ligament may be a cylindrical structure, which, referring to the cross-sectional view of FIG. 1B, may be hollow and may include three concentric tubular layers 120, 130, also shown in another cross-sectional view in FIG. 1C. In one embodiment, the three layers may include a soft layer, which may be referred to as a damping layer 120, sandwiched between two stiff layers, which may be referred to as constraining layers 130. In one embodiment the constraining layers 130 may be composed of the same substance.

Figure 2A:
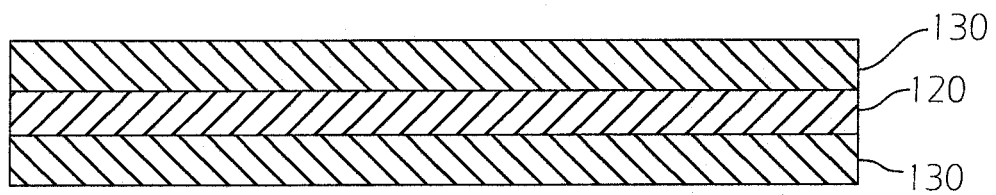
FIG. 2A is a cross-sectional view of three layers in an undeformed state according to an embodiment of the present invention.
Figure 2B:
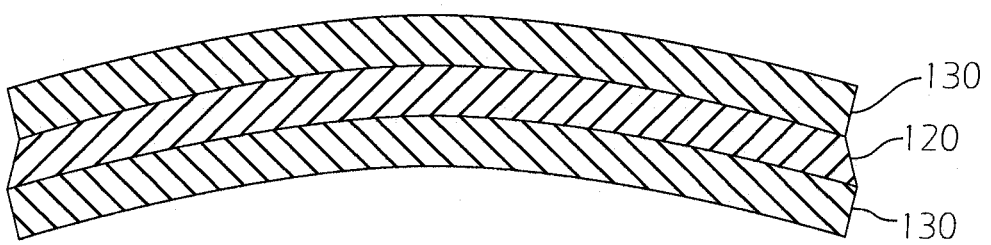
FIG. 2B is a cross-sectional view of three layers in a deformed state according to an embodiment of the present invention.

Referring to FIG. 2A, a structure with a damping layer 120 sandwiched between two constraining layers 130, may, when deformed in bending as in FIG. 2B, induce significant shear strain in the damping layer 120. The constraining layers 130 may be composed of a substance with a high Young's modulus and the damping layer 120 may be composed of a substance with a low shear modulus, e.g., a shear modulus that is less than one tenth of the Young's modulus of the constraining layers, so that when the assembly is deformed in bending, the constraining layers 130 resist elongation or compression and are locally displaced relative to each other along the composite structure, inducing shear strain in the damping layer 120. This shear strain may result in significant energy being dissipated when the damping layer 120 has a damping coefficient greater than 0.01.

Figure 3A:
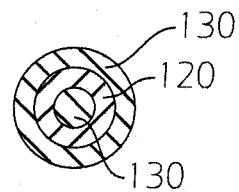
FIG. 3A is a cross-sectional view of a ligament according to an embodiment of the present invention.
Figure 3B:
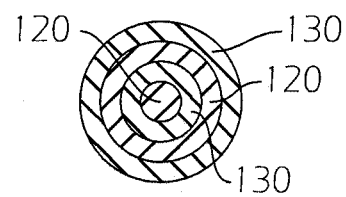
FIG. 3B is a cross-sectional view of a ligament according to an embodiment of the present invention.

Referring to FIG. 3A, in another embodiment, the ligament may have a solid core, i.e., it may not be hollow. The ligament may have a stiff central core, which may be referred to as a central constraining layer 130, surrounded by a damping layer 120 and a second constraining layer 130. Thus, as used herein, the term "layer" refers to either the solid, e.g., cylindrical core of a ligament or to a tubular element in the ligament. The solid core or tubular element forming a layer need not be precisely or even approximately cylindrical, but may for example be oval, polygonal, or irregular in shape. In one embodiment a stiff central core with a thickness of less than the damping layer is used, to prevent the structure from having excessive stiffness. In other embodiments, the ligament may have a damping layer 120 forming a solid core (FIG. 3B), and it may have a larger number of alternating damping layers 120 and constraining layers 130, with a solid core (FIG. 3C) or with a hollow core (FIG. 3D).

Figure 4A:
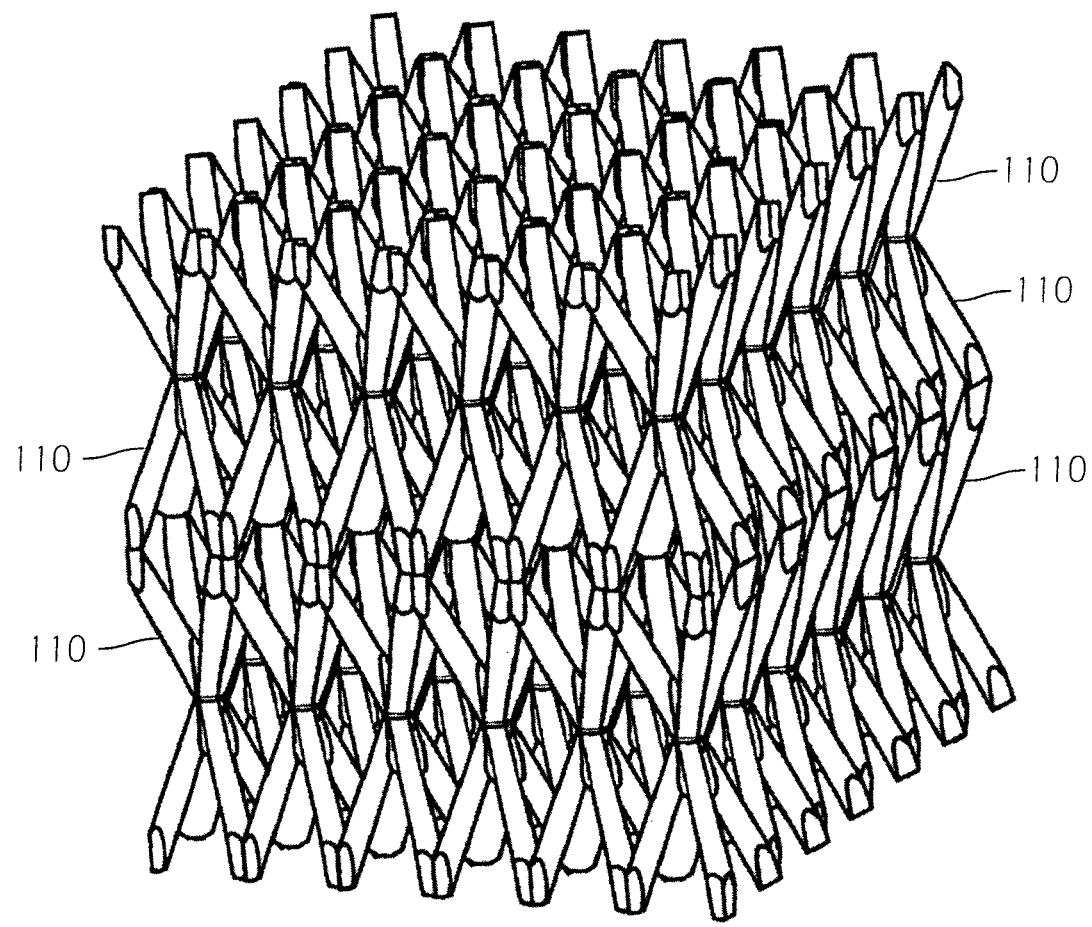
FIG. 4A is a perspective view of ligaments arranged in a micro-truss configuration according to an embodiment of the present invention.
Figure 4B:
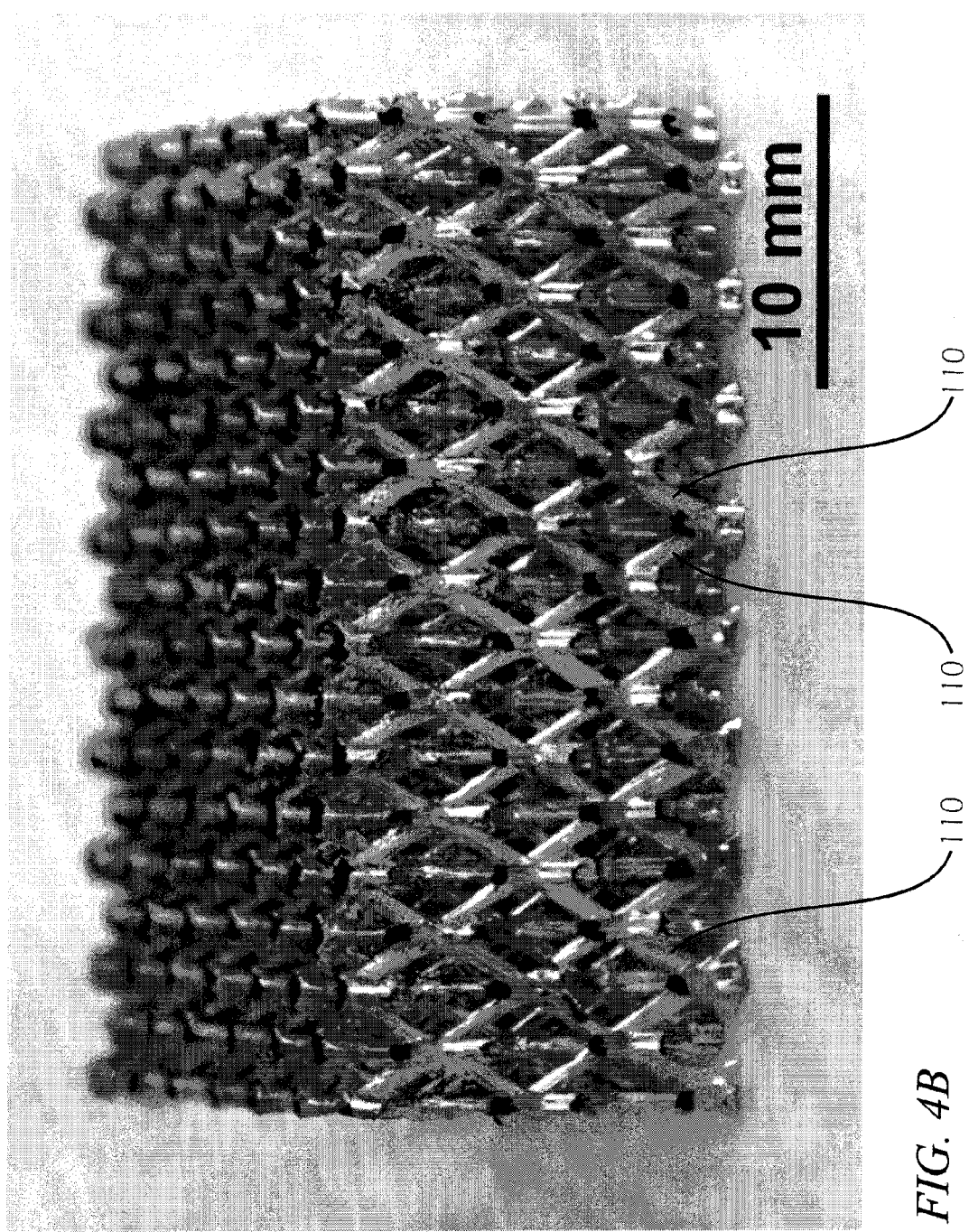
FIG. 4B is a photograph of ligaments arranged in a micro-truss configuration according to an embodiment of the present invention.
Figure 5:
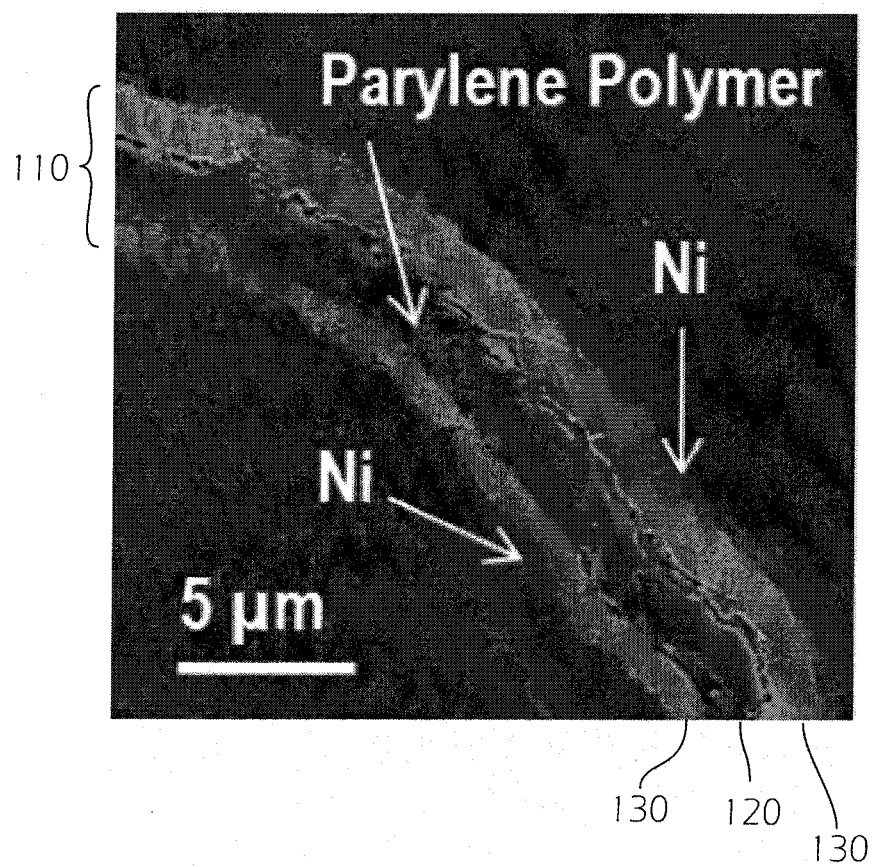
FIG. 5 is a photograph of a cross-sectional view of a portion of a ligament according to an embodiment of the present invention.

Referring to FIG. 4A, in one embodiment, the constrained microlayer cellular material may be composed of ligaments 110 arranged in the pattern of a three-dimensional microtruss, in which the ligaments 110 are truss members, which connect, e.g., interpenetrate, at a plurality of nodes. Referring to FIG. 5, each ligament 110 may be composed of an inner constraining layer 130 of nickel (Ni), an intermediate damping layer 120 of poly(p-xylylene) polymers, and an outer constraining layer 130 of nickel. FIG. 4B shows a photograph of a constrained microlayer cellular material.

A constrained microlayer cellular material having the structure illustrated in FIG. 4A, and with ligaments as shown in FIG. 5 may, for example, be fabricated by first forming a thiol-ene micro-truss template, e.g., an ordered three-dimensional (3D) microstructure of polymer waveguides, of the sort disclosed in the '959 patent and in the '279 patent. In an exemplary process for forming such a micro-truss sacrificial scaffold, a suitable photopolymerizable resin may be poured into a tray and covered with a mask having an array of holes. The tray may be irradiated, through the mask, with collimated light incident on the mask from different directions. The collimated light entering the mask from a given direction through a given hole in the mask takes the shape of a beam of light in the resin, causing one or more chemical changes in the resin within the beam. These chemical changes may affect the index of refraction, and as a result the beam may cause a waveguide to form in the resin, which then in turn guides the beam along the path where the waveguide has already formed. In particular, in one embodiment of the present invention, the collimated light may cause the resin to polymerize, resulting in a micro-truss structure. The unreacted resin may then be washed away, leaving the micro-truss template.

Figure 10:
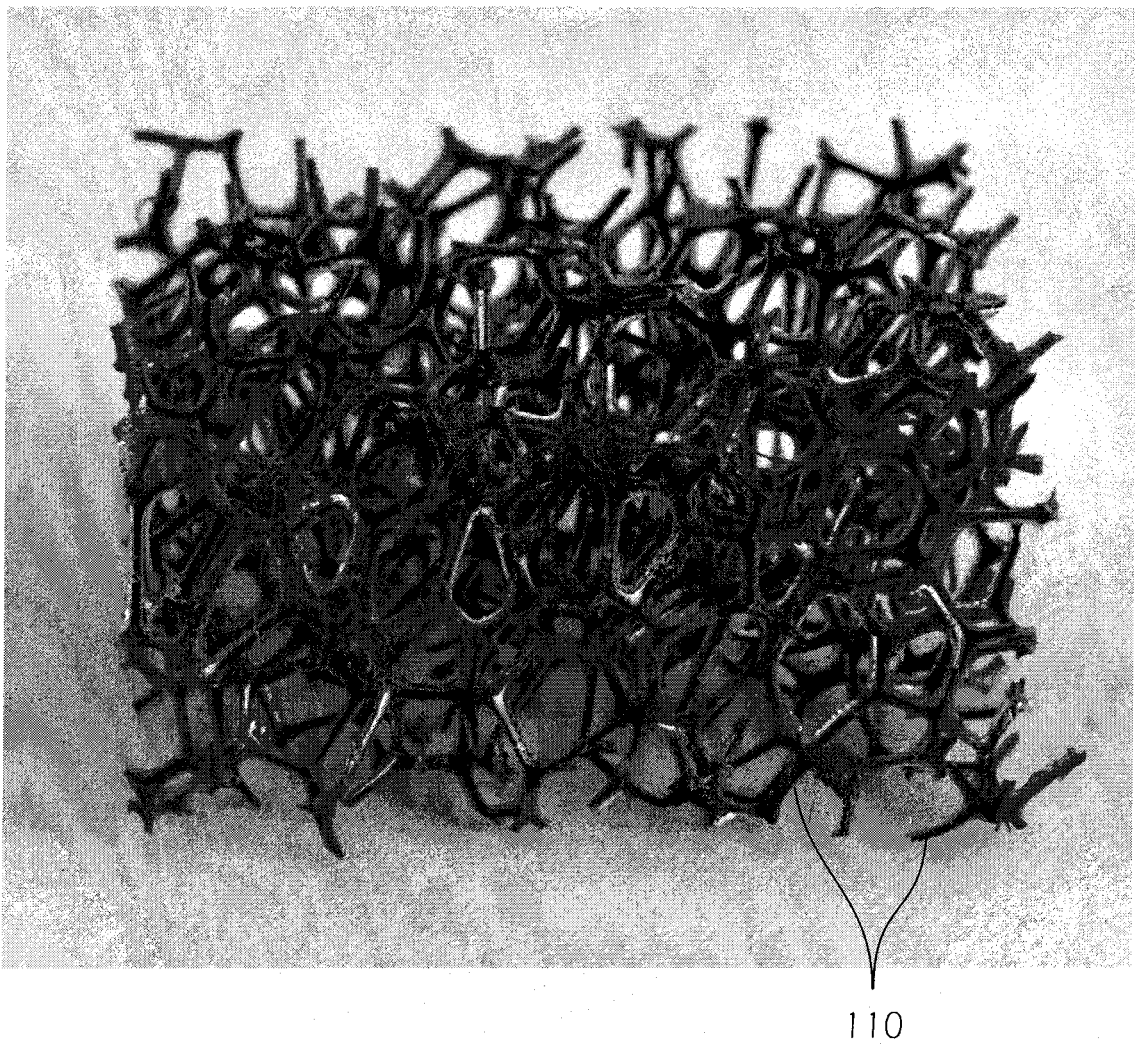
FIG. 10 is a photograph of an a constrained microlayer cellular material in the form of an open-cell foam according to an embodiment of the present invention.
Figure 11:
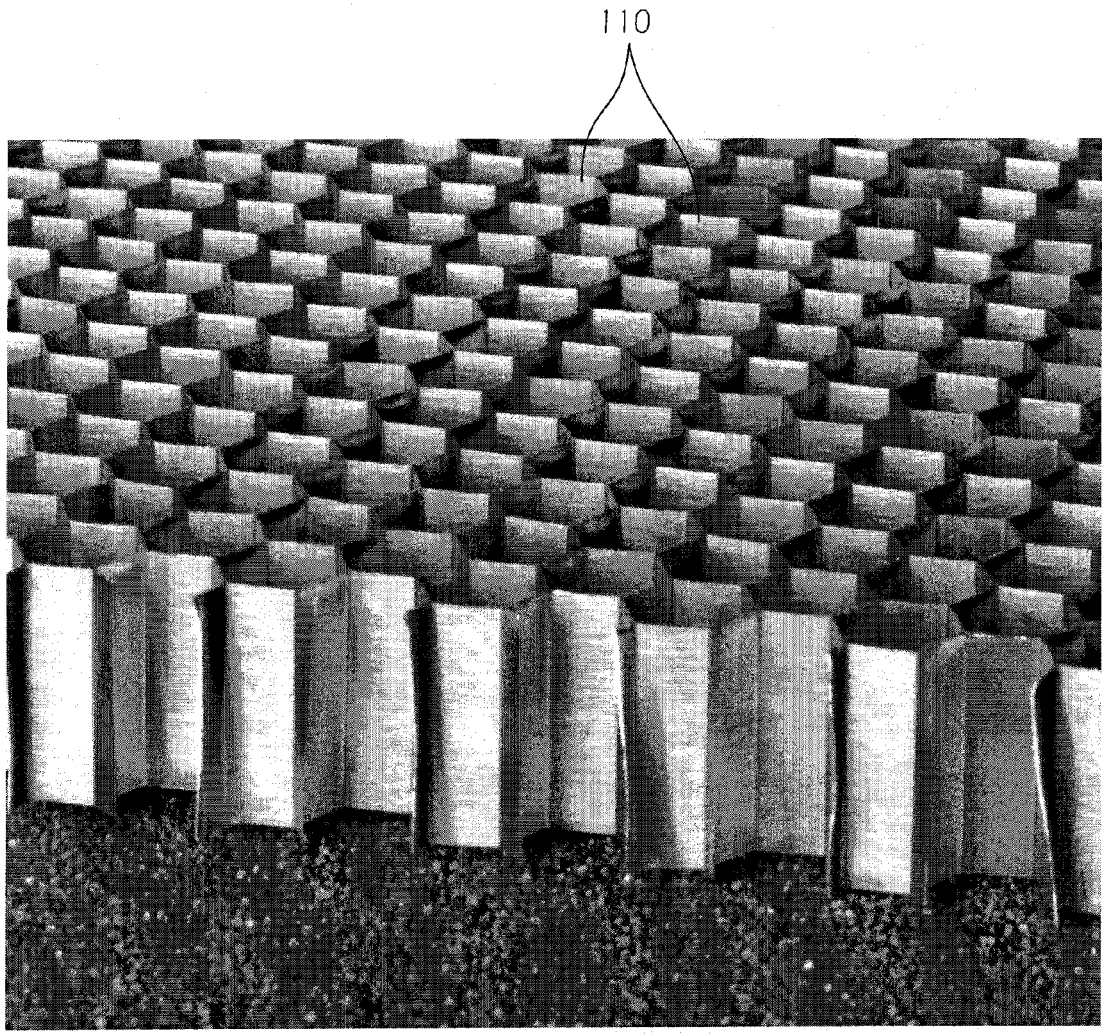
FIG. 11 is a photograph of an a constrained microlayer cellular material in the form of a honeycomb according to an embodiment of the present invention.

The template may then be coated with a 2 micron thick electroless nickel layer, a 2.5 micron thick poly(p-xylylene) polymer layer, of a poly(p-xylylene) polymer which may be referred to as parylene N, and another 2 micron thick electroless nickel layer. Subsequently the thiol-ene template may be removed by chemical etching. The resulting hollow lattice has a "sandwich" wall structure with a cross-section shown in FIG. 5. In one embodiment, the waveguides, and the resulting ligaments 110, may be substantially straight. In other embodiments, the interconnected ligaments may have a different regular structure, or an irregular structure, such as that of an open-cell foam (FIG. 10). A constrained microlayer cellular material with the structure of an open-cell foam may be formed, for example, by using a an open-cell foam as a template, coating it with a constraining layer 130, a damping layer 120, and a constraining layer 130, and then optionally removing the template, e.g., by etching. In other embodiments, the material may have the structure of a honeycomb (FIG. 11). The material may have a cell size, e.g., a node-to-node spacing, in the range of 10 micron to 3 cm. The solid volume fraction of the material may be significantly less than unity, e.g., it may be less than 0.3, where the solid volume fraction may be defined as the fraction of solid material in a sufficient quantity of the material to provide a meaningful measure, including, e.g., at least 1000 ligaments. In one embodiment, the outer diameter of a ligament may be 20 times or more the thickness of a damping layer. Techniques which may be used to form constraining layers 130 and damping layers 120 include electro-plating, electrophoretic deposition, chemical vapor deposition, physical vapor deposition, atomic layer deposition, solution deposition, sol-gel deposition, and slurry deposition.

Figure 6:
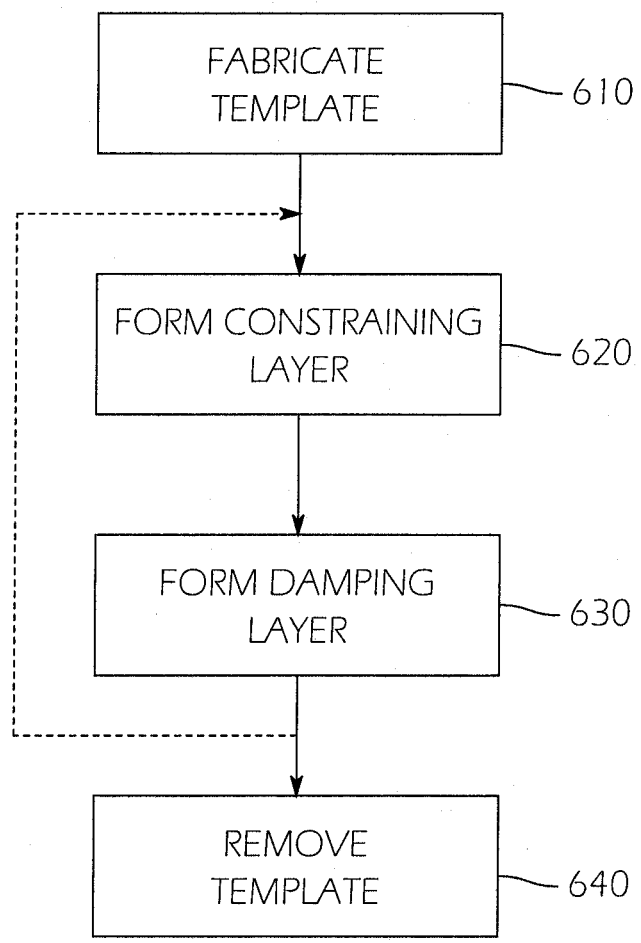
FIG. 6 is a flowchart showing acts in fabricating a constrained microlayer cellular material according to an embodiment of the present invention.

Referring to FIG. 6, the acts involved in fabricating a constrained microlayer cellular material according to one embodiment may be illustrated with a flow chart. In a first act 610, a template is fabricated, e.g., in the form of a thiol-ene micro-truss or in the form of an open-cell foam. In a subsequent act 620, a constraining layer is formed as a coating on the template, and then a damping layer is formed as a coating on the constraining layer, in an act 630. The acts 620 and 630 may be repeated, as indicated by the dashed line in FIG. 6, to form multiple alternating constraining and damping layers. In an act 640, the template may be removed, e.g., by etching.

Figure 7:
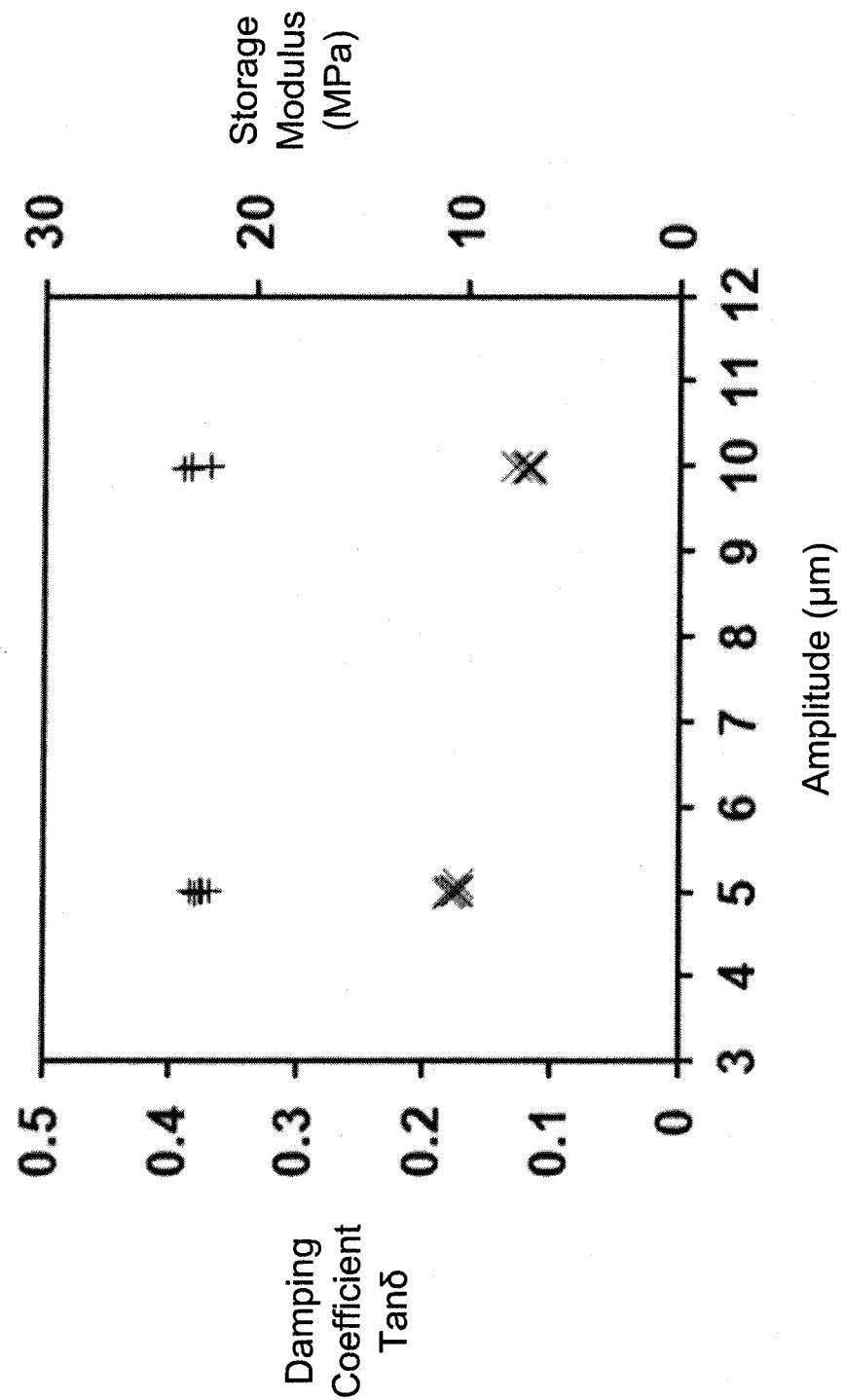
FIG. 7 is a chart showing mechanical properties of a constrained microlayer cellular material according to an embodiment of the present invention.

Referring to FIG. 7, which shows mechanical properties for the embodiment depicted in FIG. 4A and FIG. 5, measured by dynamic mechanical analysis at a frequency of 50 Hz, consistently high damping and dynamic stiffness may be achieved with such a constrained microlayer cellular material. The material may have a density of 26 mg/cm$^3$, a storage modulus of 10 MPa, and a loss coefficient (tan δ) of approximately 0.39 at 50 Hz and at an amplitude of 5-10 microns.

Figure 8:
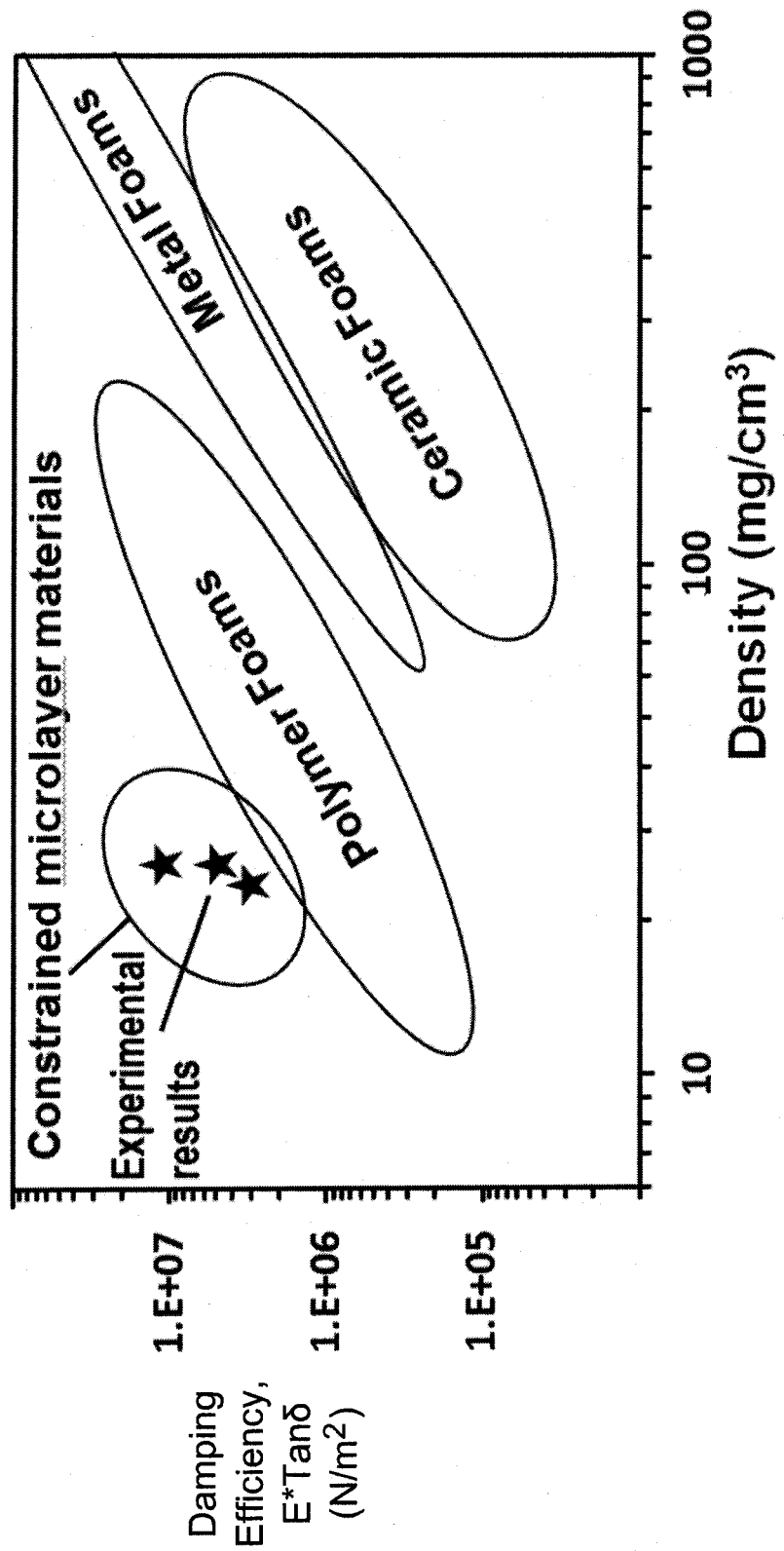
FIG. 8 is a chart showing mechanical properties of a constrained microlayer cellular material according to an embodiment of the present invention.

Referring to FIG. 8, the performance of such a material, in terms of damping achieved at a given specific stiffness, exceeds that of other materials including metals, carbon fiber composites, high-performance cellular cores such as foams, and polymers.

The thicknesses of the constraining layer and damping layer may be varied to tailor damping and stiffness, with thicker constraining layer resulting in higher stiffness and strength. Furthermore the thickness ratio of the constraining layers may be varied to influence the decrease in stiffness on exceeding the glass transition temperature (Tg) of the damping layer. In one embodiment, a constraining layer ratio of 1:1, i.e., a ratio of constraining layer thickness to damping layer thickness of 1:1, results in the highest damping but also the highest drop in stiffness when the center polymer layer becomes soft above Tg. A ratio of, e.g., 1:3, i.e., a damping layer three times as thick as the constraining layer thickness, results in lower damping but also a lower drop in stiffness. In one embodiment, the thickness of a damping layer is between 0.02 times the thickness of a constraining layer and 2 times the thickness of a constraining layer. In one embodiment, the outer diameter of a ligament 110 is at least 20 times the thickness of a damping layer 120.

Figure 3C:
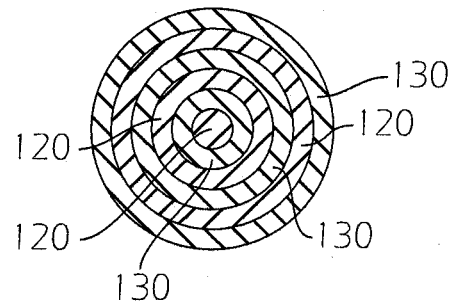
FIG. 3C is a cross-sectional view of a ligament according to an embodiment of the present invention.
Figure 3D:
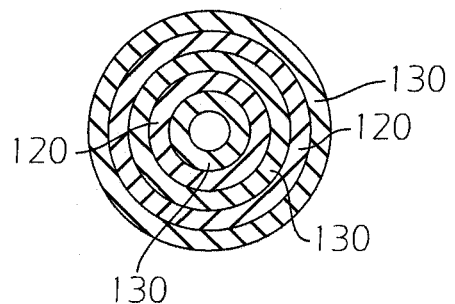
FIG. 3D is a cross-sectional view of a ligament according to an embodiment of the present invention.

In an embodiment having multiple damping layers (e.g., as shown in FIG. 3C and FIG. 3D), different polymers with different glass transition temperatures may be used as damping layers, thereby widening the temperature range where the damping is most effective. The structure or architecture of the lattice can be altered to vary stiffness and strength and influence the damping performance by changing bending modes of nodes and struts. Specific torsion architectures may be designed that translate global compressive strain into local torsion and increase the amount of strain put on the damping layer, thereby increasing damping. Envisioned embodiments include a micro-truss structure in which the struts intersect at a node off-center and force it to rotate on compression, and a micro-truss structure with s-shaped basal plane connectors that induce rotation on compression. In one embodiment, such a structure may exhibit local strain, e.g., shear strain, exceeding a uniform bulk compression by a factor greater than 5.

Various substances may be used for the constraining layers 130 and damping layers 120. For the constraining layer 130, substances with high stiffness and strength are of interest, especially metals or ceramics. A constraining layer 130 may, for example, be composed of, or of alloys of, magnesium, aluminum, titanium, vanadium, chromium, iron, cobalt, nickel, copper, zinc, zirconium, niobium, molybdenum, tantalum, or tungsten. In another embodiment, a constraining layer 130 is composed of aluminum oxide, silicon, silicon dioxide, silicon carbide, silicon nitride, diamond, diamond like carbon, hafnium oxide, lanthanum oxide, titanium dioxide, titanium nitride, tungsten nitride, zinc oxide, zirconium dioxide, hafnium carbide, lanthanum carbide, tungsten carbide, zirconium carbide, or tantalum carbide. A constraining layer 130 may also be composed of combinations of these substances, being formed, for example, of a layer of a stiff ceramic on a layer of a stiff metal.

Damping layers 120 may be composed of substances with high damping coefficients, e.g., viscoelatic polymers, rubbery polymers and soft metals such as indium (In), tin (Sn) and lead (Pb), and their alloys. Suitable polymers may include elastomers, thermoplastics, silicones, urethanes, acrylics, polyisoprene (natural rubber), polyolefins (e.g., polyethylene, chlorinated polyethylene, or polypropylene), poly(p-xylylenes), functionalized poly(p-xylylenes), poly(oxymethylenes), poly(3,4-ethylenedioxythiophene), functional poly (acrylates), methacrylates, poly(pyrrole-co-thiophene-3-acetic acids), poly(p-phenylene terephthalamides), poly (isoprene), poly(butadiene), poly(styrene-co-butadiene), poly(norbornene), poly(ethylene propylene), poly(ethylene-co-propylene-co-diene) (EPDM), polyolefins, butyl rubber (i.e., poly(isobutylene-co-isoprene)), chloroprene rubber, polysulfide rubber, chlorosulfonated polyethylene, nitrile rubber (acrylonitrile-co-butadiene), hydrogenated nitrile rubber, poly(vinylchloride-co-nitrile), poly(ether urethane), poly(ester urethane), epichlorohydrin copolymer (i.e., poly (epichlorohydrin-co-ethylene oxide)), poly(epichlorohydrin) poly(propylene oxide), ethylene vinyl acetate, silicone rubbers (e.g., polydimethyl siloxane and trifluoroisopropylmethyl siloxane), polyphosphazenes, ethylene acrylic elastomer, and poly(ethylene-co-methacrylate).

Poly(p-xylylene) polymers have an approximate tan delta of 0.02-0.05 at 20° C.; therefore, switching, in the embodiment illustrated in FIG. 5, to a highly lossy substance like viscoelastic urethane polymers (with a tan delta of between 0.3 and 0.6) may be expected to increase the damping coefficient of the corresponding constrained microlayer cellular material substantially. Multiple polymers like poly(p-xylylenes), poly(acrylates) and methacrylates, poly(p-phenylene terephthalamide) and others can be vapor deposited. The advantage of using a thin layer of a highly lossy substance like sorbothane in a constrained microlayer material instead of using it as a bulk material lies in the higher stiffness and strength and lower density of the constrained microlayer material.

In one embodiment, heat may be extracted from the constrained microlayer cellular material while maintaining high vibration absorption capacity. The constraining layers 130 may, for example, be composed of a highly thermally conductive metal that can readily extract the heat from a thin viscoelastic damping layer. This heat may then be carried off by air which may surround, or flow between, the ligaments. To enhance heat extraction a different fluid may be made to flow through the cellular material, instead of, or in addition to, air.

In one embodiment, a "dry" damping layer 120 may be used. This damping layer 120 in the sandwich or multilayer structure may be a gap instead of a viscoelastic polymer. In this case the damping may be accomplished by friction between the adjacent layers. The friction may be enhanced by roughness, surface bumps, or particles. In one embodiment the root mean square surface roughness of the surfaces facing into the gap is at least 0.5 microns. The cellular architecture may be "self-locking" in order not to fall apart when the middle layer is removed, i.e., the layers on the micro-truss structures of this embodiment may be locked together. Such a structure may be fabricated by depositing a layer suitable for subsequent removal, e.g. with a solvent or etchant. In one embodiment the layer is burned out or pyrolyzed to leave a carbon or inorganic residue behind that increases friction. In one embodiment, a brittle, e.g. ceramic, layer is deposited that "crumbles" on subsequent straining and leaves behind particles that increase friction between the constraining layers. Such a "dry" damping layer may provide damping independent of temperature and may be beneficial for applications at extreme temperatures, e.g., space applications, or high temperature applications.

In one embodiment a liquid may be used as a damping layer 120. A structure with a liquid damping layer 120 may be fabricated, for example, by fabricating a structure with a temporary solid layer in the location of the damping layer, and then removing this solid layer, e.g., by solvent, etchant, burning or pyrolysis, and substituting a viscous liquid. The liquid may then provide viscous damping, thereby changing the damping mechanism to viscous damping which may be preferred for some applications.

Figure 9:
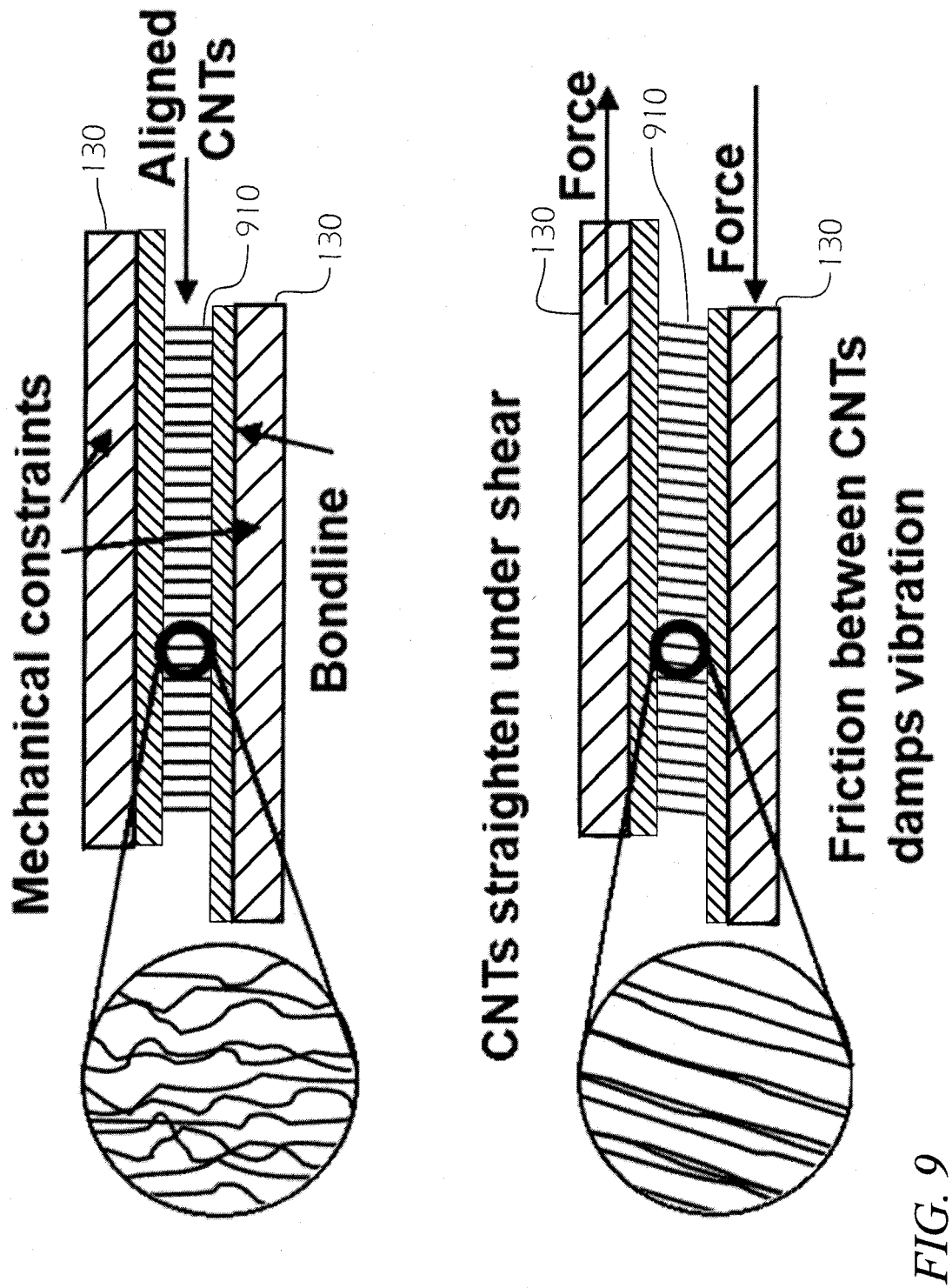
FIG. 9 is a schematic cross-sectional side view of a constrained microlayer cellular material according to an embodiment of the present invention.

Referring to FIG. 9, in another embodiment an aligned carbon nanotube (CNT) array 910 may be used between two constraining layers 130. In the typical as-grown state, these CNT arrays are not perfectly parallel, and instead exhibit considerable "internal length" that is longer than the height of the array. As the structure is mechanically strained (in this example, in shear) the CNT material straightens. In addition to straightening, the nanotubes also slide past one another, or within an optional "matrix" such as a polymer, resin, nanoparticle slurry, or rubber. In this process, the internal friction dissipates energy. CNTs are stable at high temperatures and exhibit good damping properties up to 1200° C.

As envisioned, an exemplary fabrication technique includes depositing a catalyst that promotes CNT growth on a cellular material, e.g. a micro-truss structure. Then the CNT array is grown on this substrate by any of a number of conventional means, including thermal CVD and plasma-enhanced CVD. The array is then coated with a metal, such as copper or nickel. The metal layers are deposited such that there is adhesion to the CNT array. Additional constraining layers 130 or damping layers 120 may then be deposited.

Typical mechanical properties for CNT arrays depend on growth conditions. Storage and loss modulus can be arranged from approximately 1 MPa to approximately 100 MPa, and more typically between approximately 7 MPa and 30 MPa. Loss tangent values between 0.1 and 0.25 can be obtained.

Other embodiments include allowing for fluids such as ethylene glycol, polymers such as polyethylene glycol, elastomers, e.g. silicones, or nanoparticulate materials, e.g. fullerenes, to be included in the region containing the aligned CNT layer 910. A bias force may optionally also be included perpendicular to the plane of the CNT array, increasing the compression of the CNT material and allowing for more displacement parallel to the array, i.e. in the direction producing shear deformation in the CNT layer 910.

Constrained microlayer cellular materials as described herein may have multiple useful properties. They can be designed with loss coefficient, modulus and density tailored to specific applications and can provide properties that cannot be achieved with existing materials. Constrained microlayer cellular materials can be fabricated using metal and may exhibit high damping while retaining metallic properties including high electric and thermal conductivity, environmental stability, and high temperature capability. Constrained microlayer cellular materials can operate over larger temperature ranges than conventional visco-elastic polymer dampers that are limited to a small temperature range around their glass transition temperature. Constrained microlayer damping materials offer multifunctional opportunities due to their open cellular structure, for example for simultaneous damping and active cooling or heating, damping and energy storage, or damping and impact or blast energy absorption.

Constrained microlayer cellular materials have various useful potential applications, including minimizing vibration and noise transmission, and providing improved acoustic absorbers, thinner acoustic absorbers, lighter acoustic absorbers, nonflammable high temperature acoustic absorbers, multifunctional acoustic absorbers, and improved dampers to dampen vibrations of automobile bodies or aircraft structures. They are particularly well suited to applications requiring lower mass, reduced temperature dependence, and multifunctional properties such as simultaneous vibration damping and impact protection. Acoustic materials with tunable impedance and loss, and with high strength, may find applications in hydrophone acoustic baffles in underwater applications.

Although exemplary embodiments of the constrained microlayer cellular material with high stiffness and damping have been specifically described and illustrated herein, many modifications and variations will be apparent to those skilled in the art. Accordingly, it is to be understood that the constrained microlayer cellular material with high stiffness and damping constructed according to principles of this invention may be embodied other than as specifically described herein. The invention is also defined in the following claims, and equivalents thereof.

What is claimed is:

1. A method for forming a three-dimensional open-celled cellular structure, the method comprising:
    forming a three-dimensional open-celled cellular template;
    forming a second coating layer of a second substance on the three-dimensional template;
    forming a first coating layer of a first substance on the second coating layer;
    forming a third coating layer of a third substance on the first coating layer; and
    removing the three-dimensional template,
    the first substance having a shear modulus
        less than one tenth the Young's modulus of the second substance, and
        less than one tenth the Young's modulus of the third substance.

2. The method of claim 1, wherein the second substance is the same as the third substance.

3. The method of claim 1, wherein the forming of the three-dimensional open-celled cellular template comprises forming a micro-truss template.

4. The method of claim 3, wherein the forming of the micro-truss template comprises:
    exposing a volume of a photo-monomer to collimated light through a patterned mask.

5. The method of claim 3, wherein the forming of the micro-truss template comprises:
    forming a plurality of first truss elements defined by a plurality of first self-propagating polymer waveguides and extending along a first direction;
    forming a plurality of second truss elements defined by a plurality of second self-propagating polymer waveguides and extending along a second direction; and
    forming a plurality of third truss elements defined by a plurality of third self-propagating polymer waveguides and extending along a third direction.

6. The method of claim 1, wherein one of the first substance, the second substance, and the third substance comprises, as a major component, a substance selected from the group consisting of:
    a first sub-group consisting of magnesium, aluminum, titanium, vanadium, chromium, iron, cobalt, nickel, copper, zinc, zirconium, niobium, molybdenum, tantalum, tungsten, and alloys thereof,
    a second sub-group consisting of aluminum oxide, silicon, silicon dioxide, silicon carbide, silicon nitride, diamond, diamond-like carbon, hafnium oxide, lanthanum oxide, titanium dioxide, titanium nitride, tungsten nitride, zinc oxide, zirconium dioxide, hafnium carbide, lanthanum carbide, tungsten carbide, zirconium carbide, tantalum carbide, and combinations thereof, and
    combinations of substances selected from the first sub-group and the second sub-group.

7. The method of claim 1, wherein one of the first substance, the second substance, and the third substance comprises, as a major component, a substance selected from the group consisting of polymers, thermoplastics, elastomers, rubbers, soft metals, bitumen materials, carbon nanotube arrays, and combinations thereof.

8. The method of claim 7, wherein one of the first substance, the second substance, and the third substance comprises, as a major component, a viscoelastic polymer selected from the group consisting of elastomers, thermoplastics, silicones, urethanes, acrylics, polyisoprene, polyolefins, poly(p-xylylenes), functionalized poly(p-xylylenes), poly(oxymethylenes), poly(3,4-ethylenedioxythiophene), functional poly (acrylates), methacrylates, poly(pyrrole-co-thiophene-3-acetic acids), poly(p-phenylene terephthalamides), poly (isoprene), poly(butadiene), poly(styrene-co-butadiene), poly(norbornene), poly(ethylene propylene), poly(ethylene-co-propylene-co-diene) (EPDM), polyolefins, butyl rubber, chloroprene rubber, polysulfide rubber, chlorosulfonated polyethylene, nitrile rubber (acrylonitrile-co-butadiene), hydrogenated nitrile rubber, polyvinylchloride-co-nitrile), poly(ether urethane), poly(ester urethane), epichlorohydrin copolymer, poly(epichlorohydrin) polypropylene oxide), ethylene vinyl acetate, silicone rubbers, polyphosphazenes, ethylene acrylic elastomer, poly(ethylene-co-methacrylate), and combinations thereof.

9. The method of claim 7, wherein one of the first substance, the second substance, and the third substance comprises, as a major component, a soft metal selected from the group consisting of indium, tin, lead, and alloys thereof.

10. The method of claim 1, wherein the removing of the three-dimensional open-celled cellular template comprises etching out the three-dimensional open-celled cellular template.

11. The method of claim 1, wherein one of
    the forming of the second coating layer,
    the forming of the first coating layer, and
    the forming of the third coating layer
    comprises using a technique selected from the group consisting of electro-plating, electrophoretic deposition, chemical vapor deposition, physical vapor deposition, atomic layer deposition, solution deposition, sol-gel deposition, and slurry deposition.

12. The method of claim 1, further comprising removing the first coating layer.

13. The method of claim 1, wherein the forming of the second coating layer, the forming of the first coating layer, and the forming of the third coating layer comprise forming the first coating layer having a shear modulus less than one tenth the Young's modulus of each of the second coating layer and the third coating layer.

14. The method of claim 1, wherein the forming of the three-dimensional open-celled cellular template comprises forming an open-cell foam template.

15. The method of claim 1, wherein the forming of the three-dimensional open-celled cellular template comprises forming a honeycomb template.

16. The method of claim 1, wherein the structure comprises a plurality of hollow tubes, an outer diameter of one of the plurality of hollow tubes being more than 20 times greater than a thickness of the second coating layer.

17. The method of claim 1, wherein the ratio of a thickness of the first coating layer to a thickness of the second coating layer is between 0.02 and 2.

18. The method of claim 1, wherein the first substance has a damping coefficient for which tan(s) exceeds 0.1.

19. The method of claim 1, wherein the structure includes 1000 ligaments, wherein the ratio of the total volume of the ligaments, to the total volume of the structure, is less than 0.3.

20. The method of claim 1, further comprising:
   forming a fourth coating layer of a fourth substance directly on the third coating layer; and
   forming a fifth coating layer of a fifth substance directly on the fourth coating layer,
   wherein the fourth substance has a shear modulus less than one tenth the Young's modulus of the third substance, and less than one tenth the Young's modulus of the fifth substance.

21. The method of claim 1, wherein the first substance is composed of discrete particles.

* * * * *